United States Patent [19]

Sears

[11] Patent Number: 5,789,868
[45] Date of Patent: Aug. 4, 1998

[54] TIMED PHOTOCELL SWITCH CIRCUIT

[75] Inventor: Lawrence Sears, Hunting Valley, Ohio

[73] Assignee: The Lamson & Sessions Co., Cleveland, Ohio

[21] Appl. No.: 696,266

[22] Filed: Aug. 13, 1996

[51] Int. Cl.$^6$ ................................................. H05B 37/02
[52] U.S. Cl. .................... 315/149; 315/159; 315/360; 315/362; 250/214 R; 250/214 AL
[58] Field of Search ........................ 315/149, 156, 315/157, 159, 152, 155, 158, 360, 362; 250/214 R, 214 AL

[56] References Cited

U.S. PATENT DOCUMENTS

| | | | |
|---|---|---|---|
| 2,838,716 | 6/1958 | Spierer | 315/152 |
| 3,007,080 | 10/1961 | Benson | 315/159 |
| 3,080,491 | 3/1963 | Howell | 250/206 X |
| 3,421,005 | 1/1969 | Baker | 250/214 |
| 3,428,861 | 2/1969 | Zinsmeyer | 315/159 |
| 3,450,939 | 6/1969 | Misencik | 315/156 |
| 3,483,429 | 12/1969 | Engel et al. | 315/156 |
| 3,629,649 | 12/1971 | Del Zotto | 315/159 |
| 3,636,357 | 1/1972 | Del Zotto | 250/210 |
| 3,790,848 | 2/1974 | Lai | 315/155 |
| 3,900,763 | 8/1975 | Turner | 315/156 |
| 3,901,813 | 8/1975 | Potopinski | 250/209 |
| 3,916,183 | 10/1975 | Duve et al. | 250/206 |
| 4,008,415 | 2/1977 | De Avila-Serafin | 315/156 |
| 4,147,962 | 4/1979 | Engel | 315/291 |
| 4,198,563 | 4/1980 | Elssner | 250/214 AL |
| 4,198,574 | 4/1980 | Price et al. | 315/360 X |
| 4,207,501 | 6/1980 | Smallegan | 315/159 |
| 4,209,728 | 6/1980 | Membreno | 315/159 |
| 4,237,377 | 12/1980 | Sansum | 250/214 R |
| 4,281,365 | 7/1981 | Elving et al. | 362/20 |
| 4,292,570 | 9/1981 | Engel | 315/360 |
| 4,339,696 | 7/1982 | Jabor | 315/360 |
| 4,362,970 | 12/1982 | Grady | 315/159 |
| 4,389,599 | 6/1983 | Jabor | 315/360 |
| 4,422,018 | 12/1983 | Bailey | 315/360 |
| 4,449,074 | 5/1984 | Luchaco | 315/159 |
| 4,451,763 | 5/1984 | Sodini | 315/159 |
| 4,568,868 | 2/1986 | Schlepp et al. | 320/5 |
| 4,575,659 | 3/1986 | Pezzolo et al. | 315/159 |
| 4,587,417 | 5/1986 | Duve et al. | 250/214 AL |
| 4,588,926 | 5/1986 | Pezzolo | 315/155 |
| 4,593,234 | 6/1986 | Yang | 315/362 |
| 4,595,860 | 6/1986 | Taylor | 315/158 |
| 4,629,941 | 12/1986 | Ellis et al. | 315/153 |
| 4,645,980 | 2/1987 | Yang | 315/159 |
| 4,658,129 | 4/1987 | Fan | 250/214 R |
| 4,751,399 | 6/1988 | Koehring et al. | 307/117 |
| 4,851,738 | 7/1989 | Yang | 315/159 |
| 4,876,487 | 10/1989 | Yang | 315/362 |
| 4,924,109 | 5/1990 | Weber | 307/126 |
| 4,963,793 | 10/1990 | DePauli | 315/74 |
| 5,272,418 | 12/1993 | Howe et al. | 315/159 |
| 5,406,173 | 4/1995 | Mix et al. | 315/156 |
| 5,442,177 | 8/1995 | Boulos et al. | 250/342 |

FOREIGN PATENT DOCUMENTS 2190803  11/1987  United Kingdom.

*Primary Examiner*—Robert Pascal
*Assistant Examiner*—Haissa Philogene
*Attorney, Agent, or Firm*—Jones, Day, Reavis & Pogue

[57] ABSTRACT

A timed photocell switching circuit is disclosed which senses a light-to-dark transition and applies power to a lamp load for a preset period of time. After the preset period has expired the timed photocell circuit turns the lamp load off for the remainder of the night until a dark-to-light transition resets the circuit after which it can be triggered for another timing cycle. Once the light-to-dark transition triggers the timing cycle the ambient light level cannot disrupt the circuit. In addition, the circuit can be reset regardless of its timing position by momentarily cycling power to the circuit.

20 Claims, 2 Drawing Sheets

TIMED PHOTOCELL SWITCH CIRCUIT

BACKGROUND OF THE INVENTION

The present invention is directed toward the field of electronic timer control circuits for applying power to a load (preferably a lamp) for a preset period of time upon sensing the transition from daylight to darkness.

Electronic power control circuits which incorporate a photosensitive element to turn a lamp on at dusk and off at dawn are known in the prior art. The basic concept of these circuits is to utilize a photosensitive element, such as a photoresistor or phototransistor, to sense darkness, and generate a signal which causes power to be applied to the lamp load during darkness. These prior art circuits are known as "dusk to dawn" timers because they turn the lamp on at dusk and remove power at dawn. Early such circuits suffered from a variety of problems, most notably being autoreflectance from the lamp load. The autoreflectance problem occurs when the light from the lamp load is sufficient to trigger the photocell to turn off the lamp. This causes flickering of the lamp which is undesirable.

Subsequent circuits attempted to solve this problem in a variety of ways. One way was to move the photosensor sufficiently far away from the lamp so as to minimize any lamp light from reaching the sensor. This solution, while workable, required the sensor to be attached to the circuit via an extension cable sufficient in length to prevent light from the lamp from being sensed by the photosensor, and thus is not an attractive solution, particularly for in home use where the cable would have to be routed away from the light source. Another solution to the self reflectance problem was to use a timer circuit that was triggered by the photosensor sensing a light-to-dark transition. Upon sensing dusk, this circuit would trigger a timer, the output of which would turn on the lamp load, and simultaneously remove power from the photosensor. Removing power from the photosensor prevented the reflectance problem. The timer would then count for a preset period, whereupon the output of the timer would turn off the lamp and reapply power to the photosensor. If it was still dark out, the lamp would flicker momentarily as the photosensor re-triggered the timer circuit. If during the preset period the sun had risen, then the lamp would just stay off. This solution, while attractive as a dusk-to-dawn timer is not suitable to the situation where a user wishes to have a lamp energized for a preset period of time upon sensing a light-to-dark transition, and thereafter deenergized for the remainder of the evening, whereupon the circuit automatically is reset so that the next night it can subsequently be triggered.

Previous circuits for controlling power to a lamp load in a timed manner are generally limited to dusk-to-dawn timers as described above. A disadvantage of these prior art systems is the autoreflectance problem causing flickering of the lamp. Even where the autoreflectance problem is cured, these circuits also suffered from instability during the light-to-dark transition period, when a sufficient voltage drop across the photosensor does not yet exist and the circuit alternatively turns the lamp on and then off until the ambient light level is dark enough to permanently trigger the circuit to turn the lamp on. Likewise at dusk, during the dark-to-light transitional period, these prior art circuits also suffered from instability and flickering of the lamp load.

Still other prior art circuits departed from the traditional dusk-to-dawn timers described above, and turned the light off for some period during the night when there was less need for light. These circuits suffered from several problems, however. Although generally utilizing a timer circuit, these prior art devices either suffered from the same transitional instabilities noted above at dusk, or relied on rather brute-force feedback delay elements to prevent propagation of the photosensor signal in order to force the circuit and the lamp load into an off state until the sun arose, whereafter the ambient light signal would maintain the lamp off. Circuits incorporating such a feedback delay element, or hold-off network, suffer from several problems. First, such a circuit cannot be easily reset to its initial state once it enters the hold-off mode, because even after power is removed, the user will have to wait until the RC delay element discharges. Second, the timing cycle is not very precise due to the tolerances on the RC circuit components necessary to generate the many hour delay associated with the hold-off network. None of these prior art circuits incorporated a precise timing cycle triggered by a light-to-dark transition where the circuit turned a lamp load on for a preset period of time without flickering, and then turned the lamp off for the remainder of the night, the circuit being naturally reset into its initial state upon dawn arriving.

Therefore, there remains a need for a photosensitive timer circuit that senses dusk, applies power to a lamp load for a preset period of time, and then turns the lamp off for the remainder of the night until dawn arrives, which causes the circuit to be reset.

There remains a further need for such a photosensitive timer circuit that when triggered enters into a precise preset on/off cycle, ignoring changes in the ambient light level at the photosensor.

There remains a further need for such a photosensitive timer circuit where the triggering ambient light level and the preset time cycle are adjustable.

There remains a further need for such a photosensitive timer circuit wherein the circuit can be reset to its initial timing sequence by temporarily removing power from the circuit.

There remains a further need for such a photosensitive timer circuit where the circuit is only triggered once per day after sensing a light-to-dark transition, and wherein the circuit is reset to its initial state upon sensing a dark-to-light transition.

There remains a further need for such a photosensitive timer circuit that does not require a hold-off or delay feedback network to prevent the signal from the photosensor from propagating during the off timing part of the cycle but rather utilizes a resettable light-to-dark pulse generator which only generates a triggering pulse to turn on the lamp load once per day, and where a dark-to-light transition in the morning naturally resets the pulse generator to its initial state.

SUMMARY OF THE INVENTION

The present invention overcomes the problems noted above and satisfies the needs in this field for a photosensitive timer control circuit that senses dusk (or some user controlled ambient light level near dusk), and triggers a controlled timing cycle which applies power to a lamp load for a preset period of time, and thereafter shuts off the lamp until properly reset by a dark-light transition (i.e. dawn).

According to the present invention, a biased photosensor network senses the ambient light level surrounding the circuit. The output of the biased photosensor network provides a signal level to a light-to-dark pulse triggering circuit which generates a clean, sharp pulse to begin the timing cycle. The light-to-dark pulse sets a latch, and the outputs of the latch simultaneously turn on the lamp load and reset a timer circuit to start counting. Once the latch is set, subsequent changes in the ambient lighting condition do not effect the operation of the circuit. When the timer counter circuit reaches a preset count, a clock output of the counter removes power from the lamp load. The timer counter continues to count to a second preset period of time, equal the first period, whereupon the latch is reset. At this point if it is still dark outside, the latch will not be reset because the light-to-dark pulse triggering circuit only generates a pulse when a light-to-dark transition occurs. Therefore the lamp will remain off. At dawn, when the dark-to-light transition is sensed by the photosensor biasing network, the light-to-dark pulse triggering circuit will be reset so that it can generate another pulse at the following dusk. The present invention thus incorporates two reset mechanisms, the first resets the latch, and the second resets the light-to-dark pulse generator.

The present invention includes: a biased photosensor network including an adjustable potentiometer to vary the ambient light level that triggers the circuit; a light-to-dark pulse generating circuit; a latch; a timer counter circuit; a bipolar driver transistor; a triac power switch; and a voltage regulator. These elements are configured to operate as described above, and are discussed in more detail in conjunction with the description of the preferred embodiment.

An advantage of the present invention is that it enables a lamp load to be energized for a preset period of time upon sensing a light-to-dark transition, during which time changes in ambient lighting condition are ignored, and after which period of time the lamp is deenergized and the circuit remains in a reset state until a dark-to-light transition occurs and the circuit is naturally reset.

An additional advantage of the present invention is that it incorporates user adjustable ambient light level triggering and user adjustable timing control so that a user can set the time at which power is first applied to the lamp, and also can control the length of time that the lamp will remain on during the night.

Another advantage of the present invention is that by not energizing the lamp during the entire dark hours of the night, in particular those hours when traffic is minimized, power is saved.

Yet another advantage of the present invention is that it can be easily reset to its initial state at any time by simply removing AC power from the circuit and reapplying power.

Still another advantage of the present invention is that by interposing a light-to-dark pulse generator and a latch between the photosensor biasing network and the rest of the circuitry, (i) spurious light-to-dark or dark-to-light transitions are ignored by the circuit once the initial light-to-dark transition has been sensed by the pulse generator, thus avoiding any flickering of the lamp load and (ii) the circuit can only be triggered once per day because the light-to-dark pulse generator will not generate a pulse until reset by a dark-to-light transition, which will occur at dawn.

Another advantage of the present invention is that it provides a precise set timing cycle that cannot be interrupted by changes in the ambient conditions sensed by the photosensor. Once the light-to-dark transition is sensed, the circuit changes states in an automatic mode while ignoring the ambient light level sensed by the photosensor until a dark-to-light transition occurs at dawn, at which time the circuit will return to its initial state.

As will be appreciated, the invention is capable of other and different embodiments, and its several details are capable of modifications in various respect, all without departing from the invention. Accordingly, the drawings and description of the preferred embodiment are to be regarded as illustrative in nature and not restrictive.

BRIEF DESCRIPTION OF THE DRAWINGS

The above advantages will become apparent from the following description when read in conjunction with the accompanying drawings wherein.

DETAILED DESCRIPTION OF THE PREFERRED EMBODIMENT

Figure 1A:
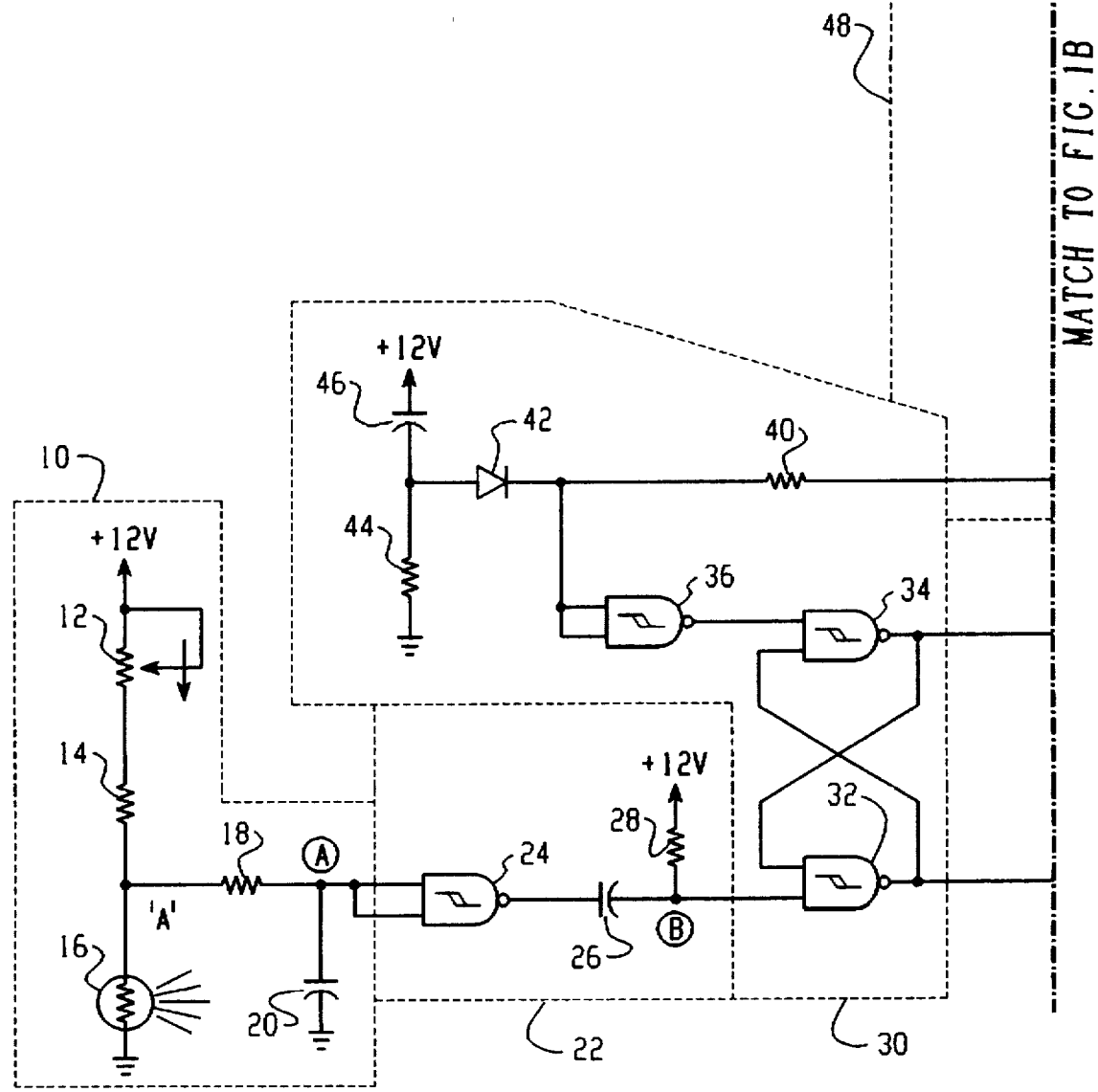
FIG. 1 is a block diagram of a circuit according to the present invention.
Figure 1B:
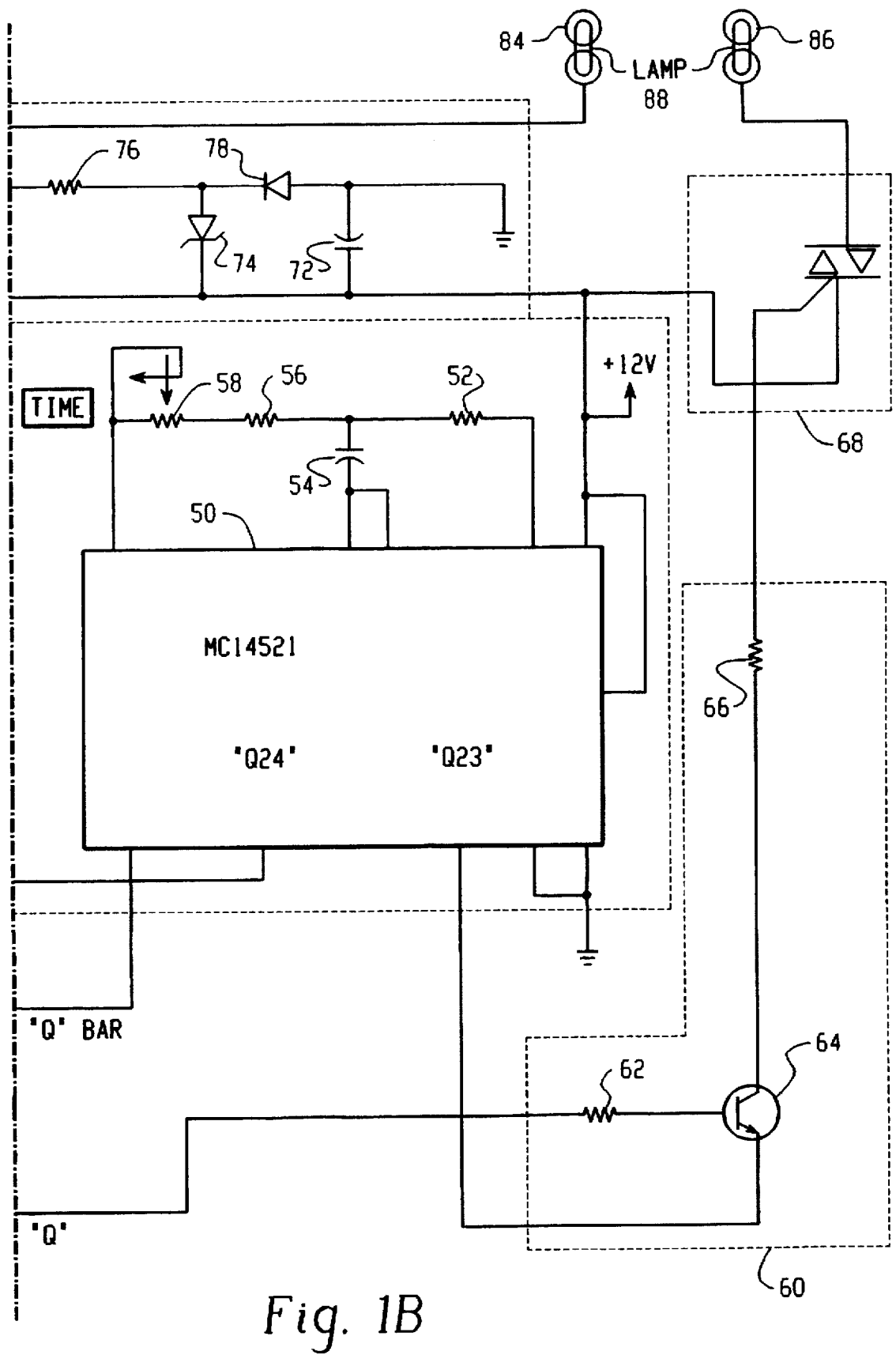

Referring now to the drawings, FIG. 1 sets forth a detailed circuit schematic according to the present invention. The circuit is composed of seven major elements: photosensor biasing network 10; light-to-dark pulse generator 22; latch 30; bipolar driver circuit 60; timer circuit 48; triac-switch 68; and voltage regulator 70.

Photosensor biasing network 10 is composed of light level adjusting potentiometer 12; nominal light level resistor 14, photosensitive element 16; and RC filter 18, 20. Potentiometer 12 and resistor 14 bias the photosensor 16 between +12 V DC power and ground. Resistor 14 sets the nominal current flow through the sensor and potentiometer 12 provides an adjustable current flow so that the user can set the circuit to turn on at different levels of sensed ambient light. The voltage drop across the photosensor 16 is indicative of the ambient light level sensed by the circuit. This occurs because the resistance of the photosensor 16 changes in relation to the ambient light striking the photoresistive element.

As less light strikes the photosensor, its resistance increases, thereby reducing current flow through the biasing network and raising the voltage level at node A, the output of the RC filter 18, 20. The RC filter 18, 20 serves to smooth out the waveform at node A. During daytime hours, when more light is striking the photosensor 16, its resistance is lower, which increases current flow through the biasing network and lowers the voltage level at node A. The ambient light level that results in a voltage level at node A sufficient to trigger the remainder of the circuit is set by adjusting the potentiometer 12, and thereby changing the nominal current flow through the photosensor.

Light-to-dark pulse generator 22 is composed of NAND Schmitt Trigger 24, coupling capacitor 26, and pull-up resistor 28. The voltage generated at node A by the photosensor biasing network is fed into both inputs of the NAND Schmitt Trigger 24, the output of which is fed through coupling capacitor 26 to node B, which is connected to the set input of the latch 30. Pull-up resistor 28 is connected between node B and +12 V DC. Using a Schmitt Trigger to sense the output of the photosensor biasing network 10 provides for a degree of noise immunity and hysteresis that prevents unwanted flickering and ensures that only a real dusk-type light-to-dark transition is occurring. The Schmitt Trigger that is part of the light-to-dark pulse generator, along with the three gates forming the set-reset latch (below) are preferably a Motorola MC14093B Quad-Schmitt Trigger integrated circuit.

The light-to-dark pulse generator 22 responds to the voltage level at node A generated by the photocell biasing network and creates a negative-going pulse (high to low) at node B which starts the timing cycle of the circuit. This negative-going pulse is only generated when node A is initially in a low state, indicative of an ambient light condition, and then transitions to a high state, indicative of a dark condition. In this manner, the light-to-dark pulse generator 22 only starts the timing cycle of the circuit upon a light-to-dark transition. Therefore, at the end of the timing cycle (discussed in more detail below), if it is still dark outside, the light-to-dark pulse generator 22 will not create an additional pulse to start another timing cycle. The node B output will simply remain in its initial high state.

Latch 30 is composed of two NAND Schmitt Trigger circuits 32, 34 which are cross-coupled to form a set-reset latch. The set input to the latch is connected to node B, the output of the light-to-dark pulse generator 22, and the reset input is connected to the output of a third NAND Schmitt Trigger 36. Capacitor 46, resistor 44, diode 42 and capacitor 38 provide a preset high voltage spike into both inputs of NAND Schmitt Trigger 36 when power is applied to the circuit in order to force the latch into an initial state where the Q output of the latch is low and the Q-bar output is high. This preset voltage spike decays after a period of time resulting in a steady-state low voltage input to the NAND Schmitt Trigger 36. The inputs of the NAND Schmitt Trigger 36 are also connected through resistor 40 to the Q24 clock output of timer circuit 48. When the Q24 clock output of the timer circuit 48 goes high a low signal is generated at the output of the NAND Schmitt Trigger 36, which resets the set-reset latch to its initial state. This is the first reset signal which occurs at the end of the second preset time period, discussed more fully below.

The Q output of the set-reset latch 30 is fed through resistor 62 to the base node of a bipolar transistor driver 64. This is preferably a 2N4401 NPN bipolar device. The Q-bar output of the latch is routed to the reset input of timer circuit 48. The emitter of the bipolar transistor driver 64 is connected to the Q23 clock output of the timer circuit 48, and the collector of the transistor is connected through resistor 66 to the gate of triac switch 68. When the Q output of the latch is high and the Q23 clock output of the timer circuit 48 is low, a sufficient Vbe (base to emitter voltage) will be present to turn on the bipolar driver and cause it to pull current from the gate of the triac switch 68. This in turn causes the triac switch 68 to conduct, thereby completing the load power circuit and permitting current to flow through the lamp load 88 from the AC power input terminals 80, 82, and thus energizing the lamp.

Timer counter circuit 48 is composed of an integrated circuit timer 50, which could be, for example, a Motorola MC14521 type counter circuit, resistors 56, 52, capacitor 54, and potentiometer 58. The external RC components 52, 54, 56 and 58 are used to set the nominal timing cycle of the counter circuit 50, with potentiometer 58 used as an adjustment so that a user of the circuit can vary the timing cycle. The timer circuit clock outputs (Q23, Q24 are shown) are normally low, and traverse to a high state as the counter counts up, in binary. Two of the timer circuit clock outputs are shown in FIG. 1, Q23 and Q24, which are respectively the 23rd and 24th bit of the counter. The 24th bit therefore represents two times the period indicated by the 23rd bit.

Timer counter 48 also includes a reset input, which will stop the timer from counting as long as a high signal is present. When a low signal is presented on the reset pin, the timer starts the light-to-dark pulse generator 22. Latch 30 output Q is initially in a low state, and Q-bar is in a high state. This initial state is forced by a transitional low output from NAND Schmitt Trigger 36, as described above. The timer clock outputs Q23, Q24 are initially low, and are held low during the initial state because of the high input to the reset input from the Q-bar output of the set-reset latch 30. During the initial state the transistor driver 64 is not conducting (since there is no Vbe across the device as the Q output of the latch is low), and therefore the triac switch 68 is not conducting and the lamp load 88 is off.

Depending upon the set point of potentiometer 12, as the sun sets and a light-to-dark transition occurs the resistance of the photosensitive element 16 increases resulting in a high voltage level at node A. As node A rises, eventually a threshold level is reached that will trigger NAND Schmitt Trigger 24. When this occurs, node B will momentarily be pulled low, but will rise shortly thereafter (a few tenths of a second) due to the series coupling capacitor 26 and pull-up resistor 28, thus generating the negative going pulse indicative of a sensed light-to-dark transition. This pulse triggers the circuit to enter the light-to-dark trigger period.

In response to the pulse output from the light-to-dark pulse generator 22 at node B, the latch 30 is set, output Q transitions to a high state and Q-bar goes low. This causes two things to happen simultaneously. First, as the Q output transitions high, a sufficient Vbe exists across the base-emitter junction of the bipolar driver 64 to turn it on, since the Q23 clock output of the timer circuit is low, thus injecting current into the base region of the bipolar driver 64 and causing it to conduct current from collector to emitter. This current is pulled through resistor 66 from the gate of triac switch 68, which causes the triac to conduct, thus completing the power switch circuit and allowing current to flow through the lamp load 88. Second, as the Q-bar output from the latch 30 transitions low, the timer circuit 48 will begin to count, in binary, at a frequency dictated by its external RC components (52–58).

During this second state, the lamp 88 is powered on, the latch 30 is set, and the timer 48 is counting. Due to the cross-coupled operation of the set-reset latch, changes at node B will have no effect on the operation of the circuit when in this state. This prevents deviations in the ambient light level from interrupting the preset timing cycle of the circuit, once triggered. The photosensor is still operational during this period, but the photosensor signal at node A cannot effect the state of the latch 30.

Eventually, depending on the user setting of the time delay associated with the timer circuit 48, clock output Q23 will transition from low to high, thus reducing the Vbe across the transistor driver 64 to zero, which in turn prevents current from being pulled from the triac switch 68, and opens the power circuit thus de-energizing the lamp load 88. At this point the circuit is in the power-off period. During the power-off period, the timed photocell switch circuit is in the same state as in the previous period where the power was being applied to the lamp load, except that the Q23 high output is preventing power from being applied to the lamp. Again, during this state, changes in ambient light level sensed by the photosensor biasing network 10 do not effect the timing cycle of the circuit since the set-reset latch 30 can only be re-set after the reset input to the latch transitions from high to low.

This second period of time where the lamp is off is equal to the first period of time when the lamp was on. This occurs because the Q24 clock output of the timer circuit 48, which transitions high to mark the end of the second timing period, represents a counted time of twice the Q23 clock output. For example, if the potentiometer 58 was set so that the Q23 clock output would transition high after 3 hours, then the Q24 output would transition high after 6 hours from the time that the timer reset line went low.

When the Q24 clock output transitions high, the circuit enters its final state, the reset state. During the reset state the lamp remains off, and the circuit is waiting for a dark-to-light transition to put the circuit back into it's initial state so that it can be triggered again by a light-to-dark transition the next evening. The reset state starts as the Q24 clock output goes high, which causes the output of NAND Schmitt Trigger 36 to go low, thereby resetting the set-reset latch into its initial state, with Q low and Q-bar high. At this point the latch 30 is in a state that it can be re-set by the pulse generator circuit 22 upon sensing of a light-to-dark transition. When Q-bar goes high, the timer counter 48 is put into the initial reset state, thereby forcing all clock outputs (including Q23, Q24) low. The transistor driver will remain off since Q is low and there is no Vbe across the base emitter junction of the transistor 64. In this state, if the photosensor biasing network 10 is still sensing darkness, the output of the NAND Schmitt Trigger 24 that is part of the light-to-dark pulse generator 22 will be low, but node B will be pulled high via coupling capacitor 26 and pull-up resistor 28. Therefore, the latch 30 will not be re-set, and an additional timing cycle will not result. Once the photosensor biasing network 10 senses the dark-to-light transition that occurs as the sun rises (dawn), the output of NAND Schmitt Trigger 24 will go high, which equalizes the charge on both plates of coupling capacitor 26, and resets the pulse generator 22 so that when the next light-to-dark transition occurs a new pulse can be generated at node B.

The pulse generator 22 is only reset after a dark-to-light transition occurs. The circuit of the present invention therefore employs two reset mechanisms. The first reset is generated by the Q24 clock output of the timer circuit 48 which resets the latch 30, and the second reset is the detection of sunrise, or a dark-to-light transition, which resets the light-to-dark pulse generator circuit 22.

In summary, and by way of example, assume that the light level potentiometer 12 has been set to trigger the circuit at 9:00 pm, and the timer potentiometer 58 has been set to generate a 3 hour clock at clock output Q23. At 9:00 pm, the photosensor biasing network 10 generates a sufficiently high voltage level to cause the light-to-dark pulse generator 22 to create a negative going pulse at node B. This sets the latch 30, turns on the lamp 88 and starts the counter 48. During this time the output of the photosensor network 10 cannot alter the set timing of the circuit. At 12:00 pm, when Q23 goes high, the bipolar driver 60 turns off, as does the triac 68 and lamp load 88. Then, three hours later at 3:00 am, Q24 goes high, which resets the latch 30 and maintains the lamp off. Since it is still dark out, the pulse generator circuit 22 will not generate another pulse to reset the latch 30. The lamp remains off. Then at dawn, the photosensor biasing network 10 generates a sufficiently low voltage at node A to reset the light-to-dark pulse generator 22, and the circuit has returned to its initial state, waiting for another light-to-dark transition at 9:00 pm the next evening to begin the cycle over again.

An additional feature of the present invention is that the timing cycle can be reset by simply removing power from the circuit. For example, and assuming the same scenario as above, if at 1:00 am, a user of the circuit wished to interrupt the set timing and manually force the lamp load on for an additional three hours, the user need only power off/on the circuit. Removing power from the circuit will return the circuit to its initial state, including resetting the light-to-dark pulse generator, such that when power is reapplied to the circuit, the photosensor biasing network will sense darkness, which will cause the reset pulse generator to generate another negative going pulse at node B and thus restart the timing cycle. The next evening the circuit will return to its regular mode of operation as described above.

Having described in detail the preferred embodiment of the present invention, including its preferred modes of operation, it is to be understood that this operation could be carried out with circuitry different than the circuitry specifically described. In addition, the particular components making up the circuit and their component values can be readily determined by those of ordinary skill in the art based on the present disclosure. This preferred embodiment is presented only by way of example and is not meant to limit the scope of the present invention which is defined by the following claims.

What is claimed:

1. A timed photosensitive power switching circuit comprising:
    a photosensor biasing network, including a photosensor and a resistive biasing network, the photosensor biasing network generating an output signal indicative of ambient lighting conditions;
    a light-to-dark pulse generator connected to the output signal of the photosensor biasing network, the light-to-dark pulse generator generating a trigger pulse signal when the output signal of the photosensor biasing network reaches a threshold voltage level;
    a timer circuit including at least one output clock signal;
    a power switch connected to the at least one output clock signal of the timer circuit; and
    a set-reset latch, including a set input connected to the trigger pulse signal of the light-to-dark pulse generator, and having a Q output and a Q-bar output, the Q output being connected to the power switch and the Q-bar output being connected to the timer circuit.

2. The timed photosensitive power switching circuit according to claim 1, wherein the set-reset latch includes a reset input connected to the at least one output clock signal of the timer circuit.

3. The timed photosensitive power switching circuit according to claim 1, wherein the power switch is turned on by the Q output of the set-reset latch.

4. The timed photosensitive power switching circuit according to claim 3, wherein the power switch is turned off by the output clock signal of the timer circuit.

5. The timed photosensitive power switching circuit according to claim 1, wherein the photosensor biasing network includes at least one adjustable component so that the output signal level that triggers the light-to-dark pulse generator can be changed to trigger the circuit at different ambient light levels.

6. The timed photosensitive power switching circuit according to claim 1, wherein the light-to-dark pulse generator includes a schmitt trigger, a coupling capacitor and a pull up resistor for generating the trigger pulse signal.

7. The timed photosensitive power switching circuit according to claim 4, wherein the trigger pulse signal generated by the light-to-dark pulse generator causes the Q output of the latch to turn on the power switch for a preset period of time, the preset period of time determined by one or more components connected to the timer circuit, and wherein at the end of the preset period of time the at least one output clock signal of the timer circuit turns off the power switch.

8. The timed photosensitive power switching circuit according to claim 7, wherein at least one of the one or more components connected to the timer circuit is adjustable so that the preset period of time can be varied.

9. The timed photosensitive power switching circuit according to claim 7, wherein after the preset period of time one output of the timer circuit resets the latch.

10. The timed photosensitive power switching circuit according to claim 1, wherein the light-to-dark pulse generator circuit only generates a trigger pulse signal in response to a light-to-dark transition, and must be reset by a dark-to-light signal sensed by the photosensor biasing network in order to generate an additional trigger pulse signal to the circuit.

11. The timed photosensitive power switching circuit according to claim 1, wherein the power switch includes a transistor driver connected to a triac power switch, wherein the transistor driver is controlled by the Q output of the latch and the at least one output clock signal of the timer circuit.

12. The timed photosensitive power switching circuit according to claim 1, wherein the circuit can be reset to an initial state of operation by momentarily cycling power to the circuit.

13. A timed photocell switch circuit that senses a light-to-dark transition and applies power to a lamp load for a preset period of time, the circuit comprising:

a photosensor biasing network for sensing the ambient lighting condition;

a light-to-dark pulse generator connected to the photosensor biasing network for generating a pulse indicative of a light-to-dark transition;

a latch connected to the pulse generator, wherein the latch is triggered by the pulse generator to create a trigger signal;

a timer connected to the trigger signal, wherein the timer is triggered to count for a preset period of time in response to the trigger signal; and a switch connected to the timer and the trigger signal, wherein the switch applies power to a load in response to the trigger signal, and wherein the switch is opened at the end of the preset period of time by the timer;

wherein the trigger signal includes a Q output and a Q-bar output of the latch, said Q output connected to the switch and the Q-bar output connected to the timer.

14. The timed photocell switch circuit according to claim 13, wherein the latch is a set-reset latch.

15. The timed photocell switch circuit according to claim 14, wherein the set-reset latch set input is connected to the pulse generated by the light-to-dark pulse generator, and the reset input is connected to a clock output of the timer.

16. The timed photocell switch circuit according to claim 13, wherein after the timer counts to the preset period of time a clock output of the timer opens the switch and removes power from the lamp load.

17. The timed photocell switch circuit according to claim 16, wherein the circuit remains in a standby state at the end of the preset period of time until a dark-to-light transition is sensed by the photosensor biasing network which resets the pulse generator so that the next light-to-dark transition can trigger the circuit.

18. The timed photocell switch circuit according to claim 13, wherein the preset period of time is adjustable.

19. The timed photocell switch circuit according to claim 13, wherein the light level sensed by the photosensor biasing network which causes the pulse generator to generate a pulse is adjustable.

20. The timed photocell switch circuit according to claim 13, wherein the light-to-dark pulse generator includes a schmitt trigger, a coupling capacitor, and a pull-up resistor.

* * * * *